(No Model.)
W. F. HUGHES.
HARROW.
No. 414,047. Patented Oct. 29, 1889.
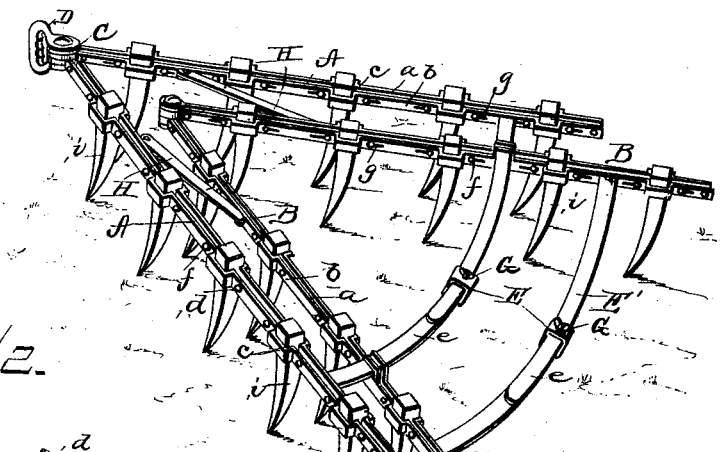
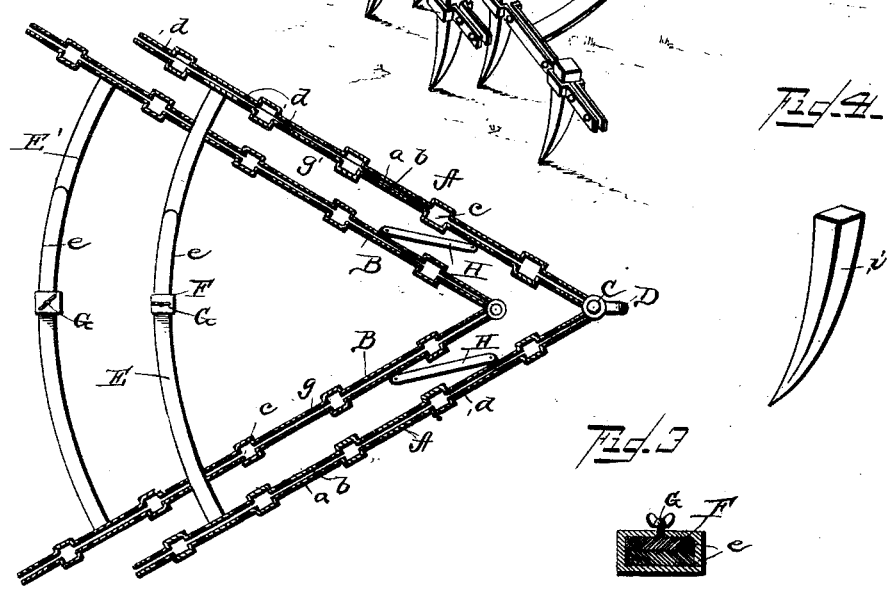
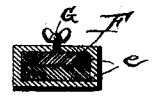
WITNESSES
F. L. Oyrand
C. F. Chisholm
INVENTOR
William F. Hughes,
by Sams Jagger & Co,
Attorneys

UNITED STATES PATENT OFFICE.

WILLIAM F. HUGHES, OF BLACK LICK, VIRGINIA.

HARROW.

SPECIFICATION forming part of Letters Patent No. 414,047, dated October 29, 1889.

Application filed June 17, 1889. Serial No. 314,655. (No model.)

*To all whom it may concern:*

Be it known that I, WILLIAM F. HUGHES, a citizen of the United States, and a resident of Black Lick, in the county of Wythe and State of Virginia, have invented certain new and useful Improvements in Harrows; and I do hereby declare that the following is a full, clear, and exact description of the invention, which will enable others skilled in the art to which it appertains to make and use the same.

My invention relates to improvements in harrows, and has reference more particularly to the class known as "adjustable wing" harrows; and the objects of my invention are, first, to provide a series of laterally-adjustable wings; second, to so attach the pairs of wings to each other that they may have vertical play, and, lastly, to provide means to fasten the teeth adjustably and firmly. Several pairs of wings constructed as herein described may be employed to accomplish these objects; but I shall describe my harrow as being composed of two pairs of wings, as illustrated in the accompanying drawings, in which—

Figure 1 represents a perspective view of the harrow with wings extended. Fig. 2 is a longitudinal sectional view of the same with the wings contracted and teeth removed. Fig. 3 is a vertical and longitudinal sectional view one of the clamps shown in Fig. 1, and Fig. 4 is a perspective view of one of the teeth shown in Fig. 1.

Like letters of reference denote corresponding parts in all the figures.

Each of the wings A is pivoted to a disk C or otherwise suitably hinged to allow lateral play, and to the disk C is also attached the usual clevis or draw-hook D. Near the rear end of each of the beams or wings A is fastened a flat bar $e$, bent in the form of an arc and of sufficient length to lap, when the wings are extended, as shown in Fig. 1, a few inches in the center, where they slide through a clamp F and are fastened by the set-screw G. These bars $e$, when fastened by the clamp F, form a brace-bar E, extending across the harrow.

When it is desired to change the width of the harrow, it is done by loosening the set-screw G and sliding the bars $e$ either outward or inward through the clamp F, and the set-screw G fastens them, making the brace-bar E of any desired length and regulating the width of the harrow accordingly. The wings A A are symmetrical, and each is formed of the two bars $a$ $b$, bent at equidistant intervals to form the tooth-recesses $c$. The outer bar $a$ is perforated near the ends and at each side of each tooth-hole $c$ with the round holes $d$, and the inner bar $b$ is fastened thereto by the bolts $f$. The inner bar $b$ is not furnished with round bolt-holes like those through the bar $a$, but with longitudinal slots $g$, which allow inner bar $b$ a certain amount of longitudinal adjustability when the bolts $f$ are loosened, thus assisting in binding the teeth $i$, which are firmly fastened by drawing up the bolts $f$. It will be seen that the bars $a$ and $b$ are so bent as to bring the corners of the teeth $i$ forward, and said teeth $i$, being easily loosened, cannot only be vertically adjusted, but can be turned to get the wear of all four corners of the teeth $i$ in succession. It will be found most desirable to employ square teeth; but the bending of the bars $a$ and $b$ may be made in any form and adapted to teeth of any shape.

The second pair of wings B B is constructed the same as the front pair A A, with the exception that a clevis or draw-hook D is not required; but in place thereof are a pair of hooks H H, which connect the wings B B to the front pair of wings A A. These hooks H H are so arranged as to allow each pair of wings to adapt itself independently to any unevenness of the ground.

The wings B B and the brace-bar E' may be either of the same length as the wings A A and brace-bar E, respectively, or they may be shorter and symmetrical in form.

It will be seen that the wings A A may be fixed to form any desired angle independently of the wings B B, and vice versa.

On level land, when but little vertical play of the parts of the harrow is required, brace-bar E' may be dispensed with and the wings B B fastened at the desired width by set-screws fixed in raised straps attached to the wings B B at such points that the bars $e$ $e$, attached to the wings A A, will slide through said raised straps.

An evident advantage which will arise from a harrow of the pattern herein described is that teeth of different sizes may be used in the same frame, as it often happens that a farmer has several kinds of land, requiring teeth of two or more sizes, in which case one set of teeth may be taken out and another set supplied. It is also possible to employ odd sizes of teeth on the harrow at the same time, as each tooth is in a measure tightened independently.

Iron of any desired size may be used in the construction of this harrow, according to the heft and size of harrow desired. It is intended to use steel teeth; but iron can be substituted, if found desirable, in any case. It will also be found practicable to construct the beams or wings A A B B of wood, and in place of bending or shaping to form the tooth-recesses c, as with iron, a notch will be cut into the bars a and b, and it will be found an improvement over beams made of one solid piece of timber, from the fact that the teeth can be tightened by drawing up the bolts f.

Having thus described my invention, I claim and desire to secure by Letters Patent of the United States—

In a harrow, the beams consisting each of two slotted and parallel bars bent or shaped to form angular tooth-recesses and adapted to slide upon one another longitudinally, in combination with the bolts for connecting and locking the bars together in their properly-adjusted position to bind the teeth, substantially as and for the purpose set forth.

In testimony that I claim the foregoing as my own I have hereunto affixed my signature in presence of two witnesses.

WILLIAM F. HUGHES.

Witnesses:
E. H. UMBERGER,
WM. B. FOSTER.